US008848543B2

(12) United States Patent
Rodrig

(10) Patent No.: US 8,848,543 B2
(45) Date of Patent: Sep. 30, 2014

(54) SYSTEM AND METHOD OF CONTROLLING IN-BOUND PATH SELECTION BASED ON HISTORICAL AND CONTINUOUS PATH QUALITY MONITORING, ASSESSMENT AND PREDICTIONS

(75) Inventor: Benjamin Rodrig, Lexington, MA (US)

(73) Assignee: Avaya, Inc., Basking Ridge, NJ (US)

( * ) Notice: Subject to any disclaimer, the term of this patent is extended or adjusted under 35 U.S.C. 154(b) by 753 days.

(21) Appl. No.: 13/090,359

(22) Filed: Apr. 20, 2011

(65) Prior Publication Data

US 2011/0194421 A1   Aug. 11, 2011

Related U.S. Application Data

(62) Division of application No. 12/182,987, filed on Jul. 30, 2008, now Pat. No. 7,953,010.

(51) Int. Cl.
| | |
|---|---|
| *H04L 12/26* | (2006.01) |
| *H04L 12/24* | (2006.01) |
| *H04W 40/12* | (2009.01) |
| *H04L 12/721* | (2013.01) |
| *H04W 40/18* | (2009.01) |

(52) U.S. Cl.
CPC ........... *H04W 40/12* (2013.01); *H04L 43/0852* (2013.01); *H04L 41/147* (2013.01); *H04L 45/70* (2013.01); *H04L 43/087* (2013.01); *H04L 43/0829* (2013.01); *H04W 40/18* (2013.01); *H04L 43/0864* (2013.01)
USPC .......................................... 370/248; 370/252

(58) Field of Classification Search
USPC .................. 370/235, 241, 252, 254, 255, 248
See application file for complete search history.

(56) References Cited

U.S. PATENT DOCUMENTS

| | | | | |
|---|---|---|---|---|
| 5,504,935 | A | * | 4/1996 | Vercauteren ................. 455/438 |
| 8,165,091 | B2 | * | 4/2012 | Nix ................................ 370/331 |
| 2005/0259637 | A1 | * | 11/2005 | Chu et al. ..................... 370/352 |
| 2006/0039365 | A1 | | 2/2006 | Ravikumar |
| 2007/0019619 | A1 | * | 1/2007 | Foster et al. .................. 370/352 |
| 2007/0103324 | A1 | * | 5/2007 | Kosuge et al. ............... 340/618 |
| 2007/0189191 | A1 | * | 8/2007 | Ades .............................. 370/254 |
| 2008/0031145 | A1 | | 2/2008 | Ethier |
| 2008/0091811 | A1 | * | 4/2008 | Wing et al. ................... 709/223 |
| 2008/0232381 | A1 | * | 9/2008 | Elwell ........................... 370/400 |
| 2008/0270618 | A1 | | 10/2008 | Rosenberg |
| 2009/0080336 | A1 | * | 3/2009 | Zhang et al. ................. 370/248 |
| 2009/0122697 | A1 | | 5/2009 | Madhyasha |
| 2009/0279436 | A1 | * | 11/2009 | Chin et al. .................... 370/237 |
| 2009/0319674 | A1 | | 12/2009 | Yahyaoui |
| 2009/0323632 | A1 | | 12/2009 | Nix |

* cited by examiner

*Primary Examiner* — Brian D Nguyen
(74) *Attorney, Agent, or Firm* — Muncy, Geissler, Olds & Lowe, P.C.

(57) ABSTRACT

A system and method of automatically controlling in-bound traffic from a first communications peer to a second communications peer based on an input from a historical path quality assessment and prediction system is disclosed. The second communications peer receives an input from the historical path quality assessment and prediction system, selects a path through a relay based on the received input, requests allocation of the relay, and sends an address of the selected relay to the first communications peer. The system and method works in concert with an Interactive Connectivity Establishment (ICE) mechanism, or takes advantage of the features of the Interactive Connectivity Establishment (ICE) mechanism.

12 Claims, 6 Drawing Sheets

SYSTEM AND METHOD OF CONTROLLING IN-BOUND PATH SELECTION BASED ON HISTORICAL AND CONTINUOUS PATH QUALITY MONITORING, ASSESSMENT AND PREDICTIONS

CROSS-REFERENCE TO RELATED APPLICATIONS

The present application is a divisional of U.S. patent application Ser. No. 12/182,987, filed Jul. 30, 2008, now U.S. Pat. No. 7,953,010 and claims the benefit of priority under 35 U.S.C. 120.

FIELD OF DISCLOSURE

The present invention provides a system and method of controlling in-bound traffic from one communications peer to another communications peer. More particularly, the present invention provides a system and method of controlling in-bound path selection from a first communications peer to a second communications peer based on an input from a historical path quality assessment and prediction system.

BACKGROUND

Conventional solutions for path selection based on path quality monitoring, assessment, and prediction, such as the Converged Network Analyzer (CNA), address the problem of path selection for limited multi-homing topologies, and only control outbound traffic.

Other conventional solutions for such path selection, which use relays to address more complex network topologies, rely on overlay networks with tunneling techniques or with static provisioning of state in the relays, or on diverting the signaling path in order to effect a change in the media session path, or on a central application controlling the whole network.

Conventional solutions are described in multiple research publications in the area of path quality, including, for example, "Path Switching and Call Protection for Reliable IP Telephony", B. Karacali1, M. Karol2, P. Krishnan1, J. Meloche1 and Y. Shen, Avaya Labs Report ALR-2006-038, "Measurement Techniques in On-Demand Overlays for Reliable Enterprise IP Telephony", B. Karacali, M. Karol, P. Krishnan, K. Kumar, and J. Meloche, in Proceedings of the IEEE International Conference on Communications (ICC), 2006, "Improving VoIP Quality Through Path Switching", S. Tao, K. Xu, A. Estepa, T. Fei, L. Gao, R. Guerin, J. Kurose, D. Towsley, and Z.-L. Zhang, in Proc. INFOCOM, 2005, which are incorporated herein by reference in their entirety.

Other conventional systems, which are no longer available, have attempted to provide dynamic re-routing of traffic to avoid congestion (http://www.venturetdf.com/new/doc/news-kagoor.htm).

Different conventional solutions describe methods of establishing connectivity through relays. For example, the future-standard Traversal Using Relays around NAT (TURN) allows a communications host to control the operation of a relay and to exchange packets with its peers using the relay. TURN is described in "Traversal Using Relays around NAT (TURN): Relay Extensions to Session Traversal Utilities for NAT (STUN)", http://tools.ietforg/html/draft-ietf-behave-turn-08, J. Rosenberg, Jun. 24, 2008, Internet Draft (work in progress, intended to become an IETF Standard), which is incorporated herein by reference in its entirety.

The TURN protocol can be used in isolation, or can be used as part of the future-standard Interactive Connectivity Establishment (ICE) mechanism that provides connectivity checks via multiple different paths, and that is designed to verify and establish connectivity through Network Address Translation (NAT). ICE will likely be an important standard in the area of Session Initiation Protocol (SIP) communications. ICE is described in "Interactive Connectivity Establishment (ICE): A Protocol for Network Address Translator (NAT) Traversal for Offer/Answer Protocols", J. Rosenberg, Oct. 27, 2007, Internet Draft (work in progress, intended to become an IETF Standard), http://tools.ietf.org/html/draft-ietf-mmusic-ice-19, which is incorporated herein by reference in its entirety.

ICE provides for connectivity checks at the current moment in time (e.g., at session set-up time) in order to verify and establish connectivity. ICE can provide for measuring the current round trip time (i.e., the current delay) as an optimization on top of verifying connectivity. The ICE standard does not, however, provide robust assessments or measurements of path quality.

SUMMARY

Some conventional systems provide path selection based on path quality monitoring and assessment, for limited multi-homing topologies. However, these conventional solutions only control outbound traffic and do not control in-bound traffic. That is, these conventional systems fail to address or even contemplate controlling in-bound path selection. These conventional systems do not dynamically establish and control in-bound traffic to a communications peer from another communications peer.

In stark contrast, other conventional systems have been provided for controlling in-bound traffic, but these conventional systems do not take into account any historical, time-frame, continuous data, information, or measurements regarding path quality in the path selection decision making process. That is, these conventional systems do not take into account historical path quality monitoring, assessments, and/or predictions in the decision-making process in controlling in-bound traffic.

The present invention recognizes that there is a need for a communications peer to control in-bound traffic from another communications peer while also taking into account historical path quality monitoring, assessments, and/or predictions in the decision-making process in controlling the path selection of the in-bound traffic. The present invention recognizes that controlling in-bound traffic while taking into account path quality assessments is much more difficult and has not been addressed by the conventional solutions up to this point.

To solve the aforementioned problems with the conventional art, the present invention provides a system and method of controlling in-bound traffic from one communications peer to another communications peer. More particularly, the present invention provides a system and method of controlling in-bound path selection from a first communications peer to a second communications peer based on an input from a historical path quality assessment and prediction system.

The exemplary features of the invention provide a simple solution to the problem described above of affecting the media path of inbound traffic while taking into account path quality assessments. The present invention provides an important advantage of automatically setting up paths through relays and forcing the in-bound traffic to a communications peer to take a selected path, such as a preferred path, based on robust historical and continuous path quality monitoring, assessments, and predictions.

In an embodiment, the present invention takes advantage of Traversal Using Relays around NAT (TURN) relays (or servers) to provide a simple solution to the problem described above of affecting the media path of inbound traffic. According to these exemplary aspects, an offerer (i.e., second communications peer) receives an input from a historical and continuous path quality monitoring, assessment, and prediction system, requests allocation of a relay (e.g., allocation of a TURN server), and then sends the selected address (e.g., TURN address) to the other side (i.e., first communications peer).

For example, an embodiment of the invention provides a method of automatically controlling in-bound traffic from a first communications peer to a second communications peer based on an input from a historical path quality assessment and prediction system. The method includes receiving, by the second communications peer, the input from the historical path quality assessment and prediction system, and selecting a path through a relay based on the received input. The method further includes requesting, by the second communications peer, allocation of the relay, and sending, by the second communications peer, an address of the selected relay to the first communications peer.

The present invention also provides a system for automatically controlling in-bound traffic between communications peers. The system includes a first communications peer, a second communications peer, and a historical path quality assessment and prediction system. The second communications peer automatically controls in-bound traffic from the first communications peer to the second communications peer based on an input from the historical path quality assessment and prediction system.

In another embodiment of the invention, a path quality assessment system, which makes an inbound path selection based on historical path quality assessments, can be leveraged to coexist and/or work in concert with an Interactive Connectivity Establishment (ICE) exchange. The embodiment provides path quality assessment based on much richer and deeper information than simple connectivity and round trip time checks.

For example, another embodiment provides a method of automatically controlling in-bound traffic from a first communications peer to a second communications peer based on an input received from a historical path quality assessment and prediction system. The method includes automatically setting-up, by the second communications peer, one or more relays, sending, by the second communications peer, to the first communications peer, a transport address of the one or more relays and one or more local addresses for direct communications, per an Interactive Connectivity Establishment (ICE) mechanism, nominating, by the second communications peer, a candidate pair based on the input received from the historical path quality assessment and prediction system, and indicating, by the second communications peer, the nominated candidate pair with a flag using the Interactive Connectivity Establishment (ICE) mechanism.

The present invention also provides a system for automatically controlling in-bound traffic between communications peers based on an input received from a historical path quality assessment and prediction system. The system includes a first communications peer, a second communications peer, and a historical path quality assessment and prediction system. The second communications peer automatically sets-up one or more relays and sends to the first communications peer a transport address of the one or more relays and one or more local addresses for direct communications, per an Interactive Connectivity Establishment (ICE) mechanism. The second communications peer nominates a candidate pair based on the input received from the historical path quality assessment and prediction system and indicates the nominated candidate pair with a flag using the Interactive Connectivity Establishment (ICE) mechanism.

The embodiments of the invention can coexist or work in concert with the features of the Interactive Connectivity Establishment (ICE) and the TURN/STUN-Relay component of ICE, for example, which are being used for the purposes for which these features are intended or designed, or alternatively, for other purposes.

For example, an embodiment takes advantage of the features of the Interactive Connectivity Establishment (ICE) and the TURN/STUN-Relay component of ICE for purposes that are different than the purposes for which these features are intended or designed, in order to dynamically establish connectivity through relays when performing path selection between multiple possible paths based on historical and continuous path quality monitoring, assessment, and predictions.

An embodiment takes advantage of, and makes use of, the features of the interaction in ICE to provide improvements in path quality assessment. The embodiments can be applied to multiple relays representing different paths through the network even if the ICE mechanisms would not otherwise be applied to these relays for the other purposes that ICE is used for, and ICE can be used for this purpose even if there is no need to traverse network address translations (NAT's) or any other need to use ICE.

An embodiment can provide, for example, a hub and spoke system of communications peers and relays in which the path quality assessment of each side of the communication only is performed between each respective communications peer and the relay. This embodiment can provide an advantage with respect to scaling by reducing the number of connections and measurements needed, for example, from $O(n^2)$ to $O(n)$.

Other aspects of the invention can take advantage of the Interactive Connectivity Establishment (ICE) mechanism (and its TURN/STUN-Relay component) for the purpose of dynamically establishing connectivity through relays as part of a path selection solution based on path quality assessment and which is performed-either pre-call or mid-call. The features of the invention allow the incorporation of path selection and path quality assessment into the architecture of IP communications solutions based on Session Initiation Protocol (SIP) and Session Description Protocol (SDP) without requiring changes to the solution architecture.

For example, yet another embodiment provides a method of automatically controlling traffic between a first communications peer to a second communications peer. The method includes separately performing path quality assessments for one or more portions of the path, concatenating the path quality assessments, wherein the path quality assessments include one or more quality metrics that are indicated in an Interactive Connectivity Establishment (ICE) mechanism, and making a path selection decision based on the concatenated path quality assessments.

The present invention also provides a system for automatically controlling traffic between communications peers. The system includes a first communications peer, a first historical path quality assessment and prediction system that performs path quality assessments for a first portion of one or more paths, a second communications peer, and a second historical path quality assessment and prediction system that performs path quality assessments for a second portion of the one or more paths. The second communications peer concatenates the path quality assessments. The path quality assessments include one or more quality metrics that are indicated in an Interactive Connectivity Establishment (ICE) mechanism. The second communications peer makes a path selection decision based on the concatenated path quality assessments.

The exemplary aspects of the present invention provide advantages over the conventional systems and methods, such as improving scale and flexibility and simplifying the operation of path selection and path quality assessment solutions. The features of the invention provide an advantage of allowing incorporation of path selection based on path quality assessments for quality optimization into the architecture of IP communications solutions based on Session Initiation Protocol (SIP) signaling, such as voice over IP (VoIP) and video over IP, and Session Description Protocol (SDP) without requiring changes to the solution architecture, such as using overlay networks, tunneling and encapsulation, which can be costly from an operations-perspective. For example, the features of the invention can provide quality-improvement features through path selection solution based on path quality assessments to IP communications devices such as P2P-SIP IP phones, and to additional types of IP endpoints, gateways, Session Border Controllers (SBC), Media Servers and other devices.

A complete understanding of the present invention, as well as further features and advantages of the present invention, will be obtained by reference to the following detailed description and drawings.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

To solve the aforementioned problems with the conventional art, the present invention provides a system and method of controlling in-bound traffic from one communications peer to another communications peer. More particularly, the present invention provides a system and method of controlling in-bound traffic from a first communications peer to a second communications peer based on an input from a historical path quality assessment and prediction system.

Exemplary embodiments of the invention will now be described with reference to FIGS. 1-6.

Figure 1:
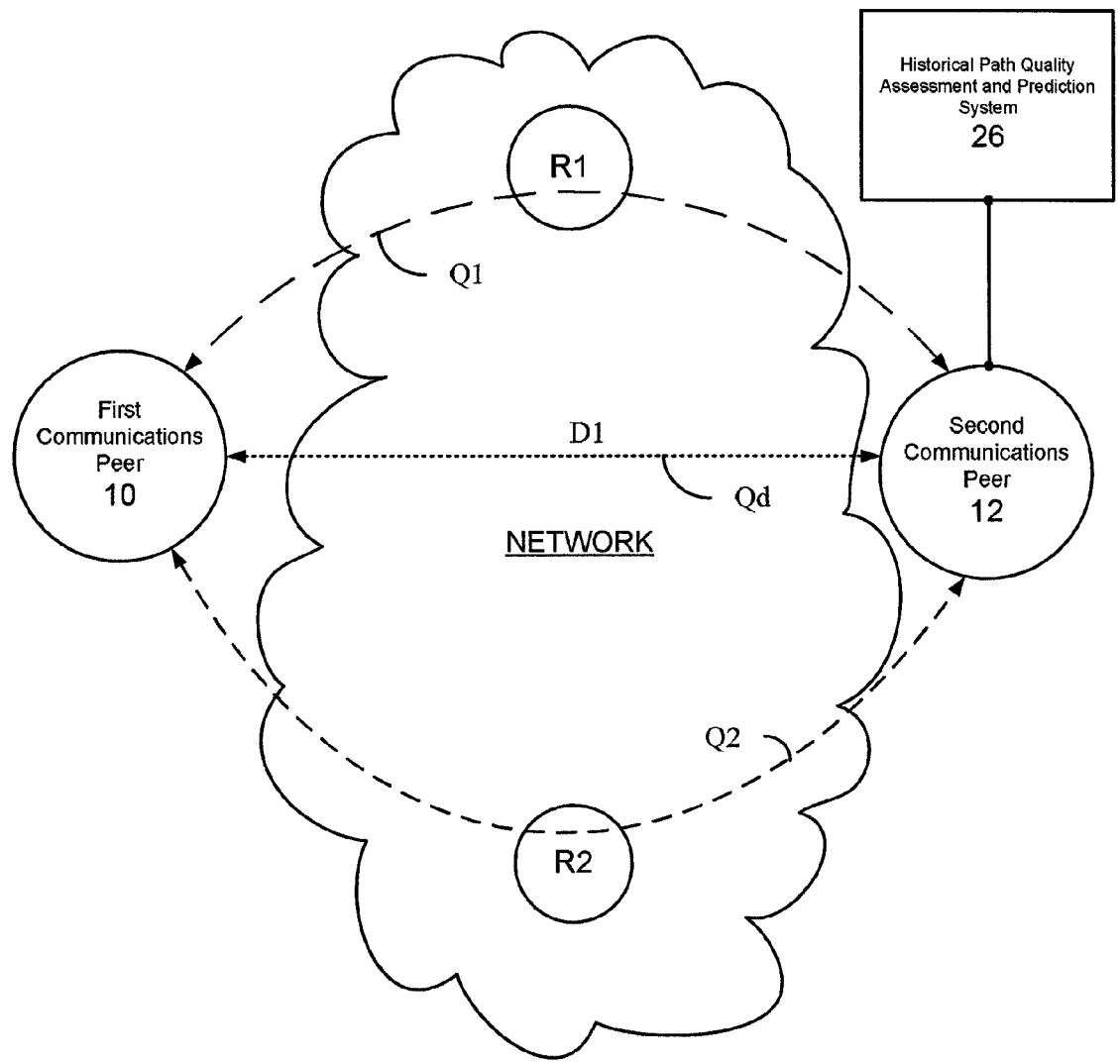
FIG. 1 depicts a system according to an embodiment of the invention.

With reference to FIG. 1, a method and system for automatically controlling in-bound traffic from a first communications peer to a second communications peer, according to an embodiment, will now be described.

As shown in FIG. 1, the embodiment includes a first communications peer 10 and a second communications peer 12. The first communications peer 10 and the second communications peer 12 can communicate with each other through one or more paths. For example, the first communications peer 10 and the second communications peer 12 can communicate with each other through a direct path D1. The first communications peer 10 and the second communications peer 12 also can communicate with each other using paths through, for example, a relay R1, R2, etc. One or more of the relays R1, R2, etc. can be, for example, a TURN (Traversal Using Relays around NAT) server. Any number of communications peers and relays can be provided, and the system is not limited to first and second communications peers 10, 12 or relays R1, R2.

As shown in FIG. 1, the embodiment includes a historical path quality assessment and prediction system 26, which can be running, for example, on the second communications peer 12 or on a separate system interacting or communicating with the second communications peer 12. According to embodiments of the invention, the second communications peer 12 automatically controls in-bound traffic from the first communications peer 10 to the second communications peer 12 based on an input from the historical path quality assessment and prediction system 26.

Exemplary aspects of the historical path quality assessment and prediction system 26 will now be described.

As shown in FIG. 1, the quality of the paths between the first communications peer 10 and the second communications peers 12 through one or more relays R1 and R2 are indicated by a path quality Q1 and Q2, respectively. One of ordinary skill in the art will recognize that the direct path D1 between the first communications peer 10 and the second communications peer 12 also has a quality Qd. The historical path quality assessment and prediction system 26 can provide, for example, historical path quality monitoring, assessments, and predictions for path qualities Q1, Q2, etc. The path quality monitoring, assessments, and predictions can be, for example, continuous, substantially continuous, or intermittent. For example, the historical path quality assessment and prediction system 26 may be configured to continuously monitor traffic along a given path. If the traffic along the path pauses, then the monitoring correspondingly pauses.

The input received from the historical path quality assessment and prediction system 26 can be derived from one or more of historical measurements, policy, assessments, and selection algorithms. These can include one or more of historical perspectives, measurements taken over a period of time, or continuous measurements from a point in time to the present time, among other things.

The historical path quality assessment and prediction system 26 provides an important advantage of looking at past information to obtain a better understanding of the quality Q1, Q2 of the available paths. The historical path quality assessment and prediction system 26 takes into account historical perspectives, such as historical measurements, monitoring, and/or whatever indications or information is available with respect to the path quality that have been taken over time, instead of simply looking at the current point in time and performing simple connectivity and round trip time checks.

For example, embodiments of the historical path quality assessment and prediction system 26 can take into account continuous, longer term (e.g., over several minutes or longer) monitoring/measuring of the path quality. The historical path quality assessment and prediction system 26 can measure the path quality (e.g., quality of traffic) continuously over time or over periods of time (e.g., long term), taking into account such things as packet loss, percentage of packet loss over time, delay and jitter (i.e., variation of delay) over time, trends, etc., and derive a quality assessment based on this historical or timeframe data. Accordingly, the present invention can provide a better assessment and/or prediction of the quality of a path or paths, particularly with respect to important factors such as packet loss.

Moreover, by using this data and assessments, the present invention can provide a prediction of a future path quality, for example, over the next few minutes, instead of simply looking at the current point in time and performing simple connectivity and round trip time checks.

Figure 2:
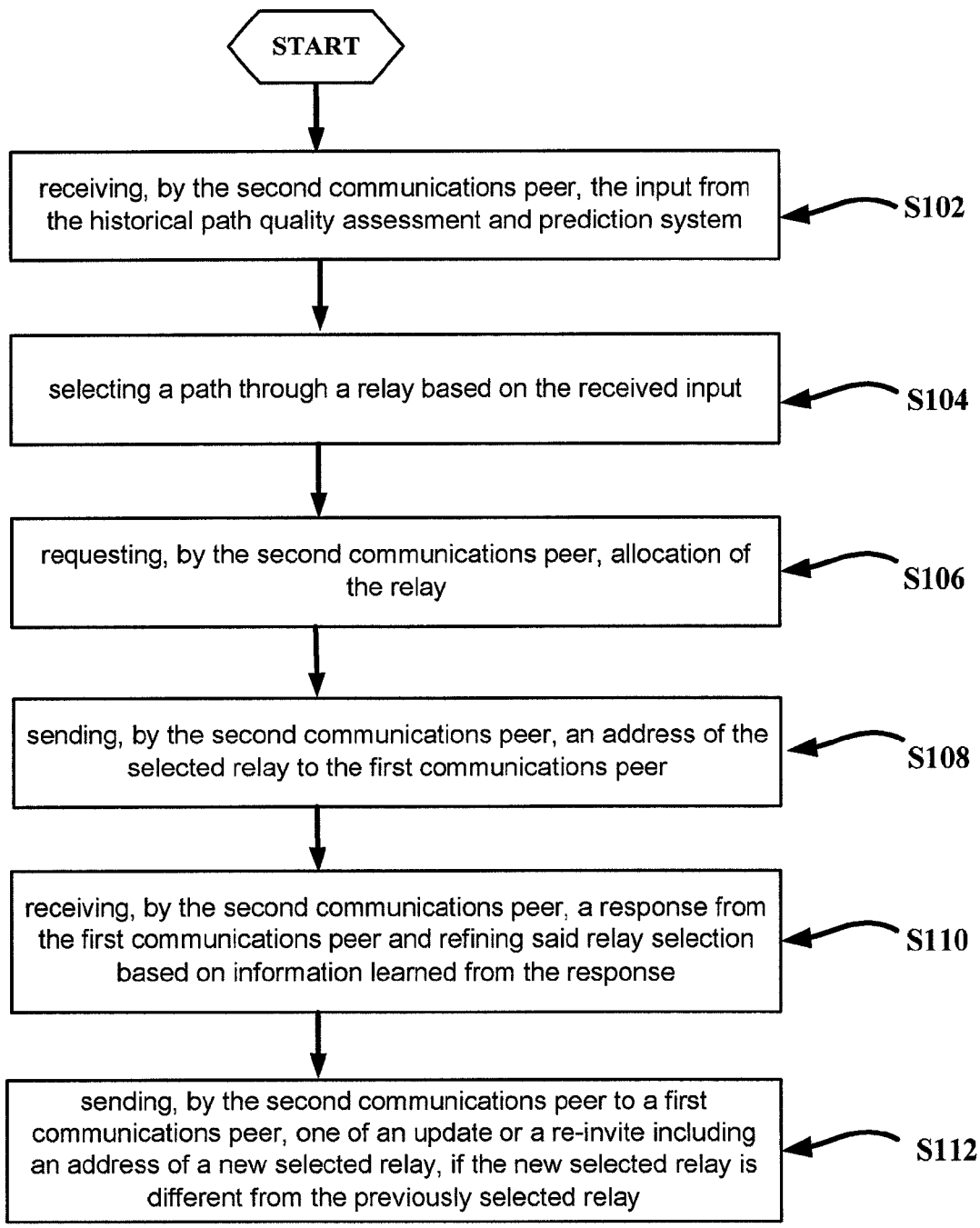
FIG. 2 depicts a method according to an embodiment of the invention.

With reference to FIG. 2, a method of automatically controlling in-bound traffic from a first communications peer 10 to a second communications peer 12 based on an input from the historical path quality assessment and prediction system 26, will now be described.

The exemplary method includes a step of receiving, by the second communications peer 12, an input from the historical path quality assessment and prediction system 26 (S102). The second communications peer 12 selects a path through a relay (e.g., one of relays R1 and R2) based on the received input from the historical path quality assessment and prediction system 26 (S104). The method further includes requesting, by the second communications peer 12, allocation of the relay (e.g., selected relay R1) (S106) and sending, by the second communications peer 12, an address of the selected relay (e.g., relay R1) to the first communications peer 10 (S108). The second communications peer 12 sends the address, for example, in Session Description Protocol (SDP), to the first communications peer 10 as part of a SIP signaling exchange. The address can be, for example, an Internet Protocol version 4 (IPv4) address or an Internet Protocol version 6 (IPv6) address.

As explained above, the input received from the historical path quality assessment and prediction system 26 can be derived from one or more of historical measurements, policy, assessments, and selection algorithms. The path quality assessments can be performed, for example, by the second communications peer 26 or a system interacting with the second communications peer 26. One or more of the relays (e.g., relays R1, R2, etc) can be, for example, a TURN server.

Another embodiment can include the further steps of receiving, by the second communications peer 12, a response from the first communications peer 10 and refining the relay selection based on information learned from the response (S110). The learned information can include, for example, an IP address of the first communications peer 10. In this embodiment, the second communications peer 12 then sends to the first communications peer 10 one of an update or a re-invite including an address of a new selected relay (e.g., relay R2), if the new selected relay (e.g., relay R2) is different from the previously selected relay (e.g., relay R1) (S112).

In yet another embodiment, the method automatically controls the in-bound traffic from the first communications peer 10 to the second communications peer 12 pre-call or mid-call. For example, if a change in network conditions is determined mid-call, the second communications peer 12 repeats the step of selecting (e.g., S104) based on a new input from the historical path quality assessment and prediction system 26 and sends one of an update or a re-invite to the first communications peer 10 with another address of a new selected relay (e.g., relay R2), if the new selected relay (e.g., relay R2) is different from the previously selected relay (e.g., relay R1).

According to the above described embodiments, and with reference again to FIGS. 1 and 2, the second communications peer 12 receives an input from a historical path quality monitoring and assessment system, which is monitoring path quality. The second communications peer 12 then uses the input from the historical path quality monitoring and assessment system to make a decision or choose which relay (e.g., TURN server) the second communications peer 12 prefers to be used for in-coming traffic without necessarily knowing who is on the other side of the communication. That is, the second communications peer 12 makes a selection on which relay (e.g., R1 or R2) to use prior to any exchange with another communications peer (e.g., the first communications peer 10).

Figure 3:
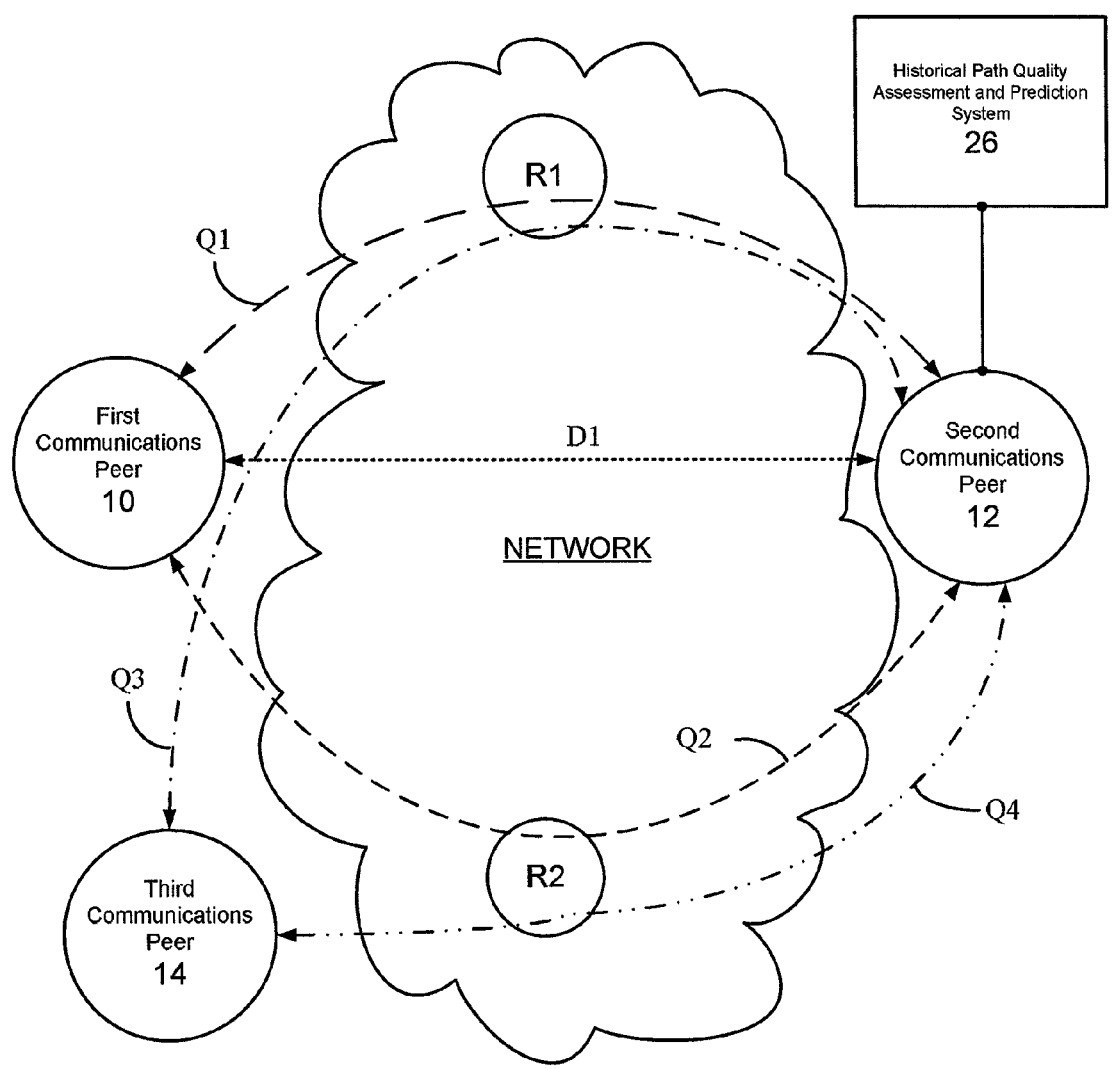
FIG. 3 depicts a system according to an embodiment of the invention.

As shown, for example, in FIG. 3, any number of communications peers and relays can be provided, and the system is not limited to first and second communications peers 10, 12 or relays R1, R2. For example, based on the input from a historical path quality monitoring and assessment system 26, the second communications peer 12 actively can decide that, if in-bound traffic is coming from the first communications peer 10, then the relay R1 should be used. On the other hand, if the in-bound traffic is coming from a third communications peer 14, then the second communications peer 12 can decide that the relay R2 should be used for in-coming traffic.

In yet another example, the second communications peer 12 actively can decide to use relay R2, irrespective of who is on the other side. For example, if the quality of the connection to relay R1 is poor based on the input from the historical path quality monitoring and assessment system 26, the second communications peer 12 can request allocation of relay R2 and then just send the selected address of relay R2 in SDP to the other side (e.g., to the first communications peer 10 and/or the third communications peer 14).

Figure 4:
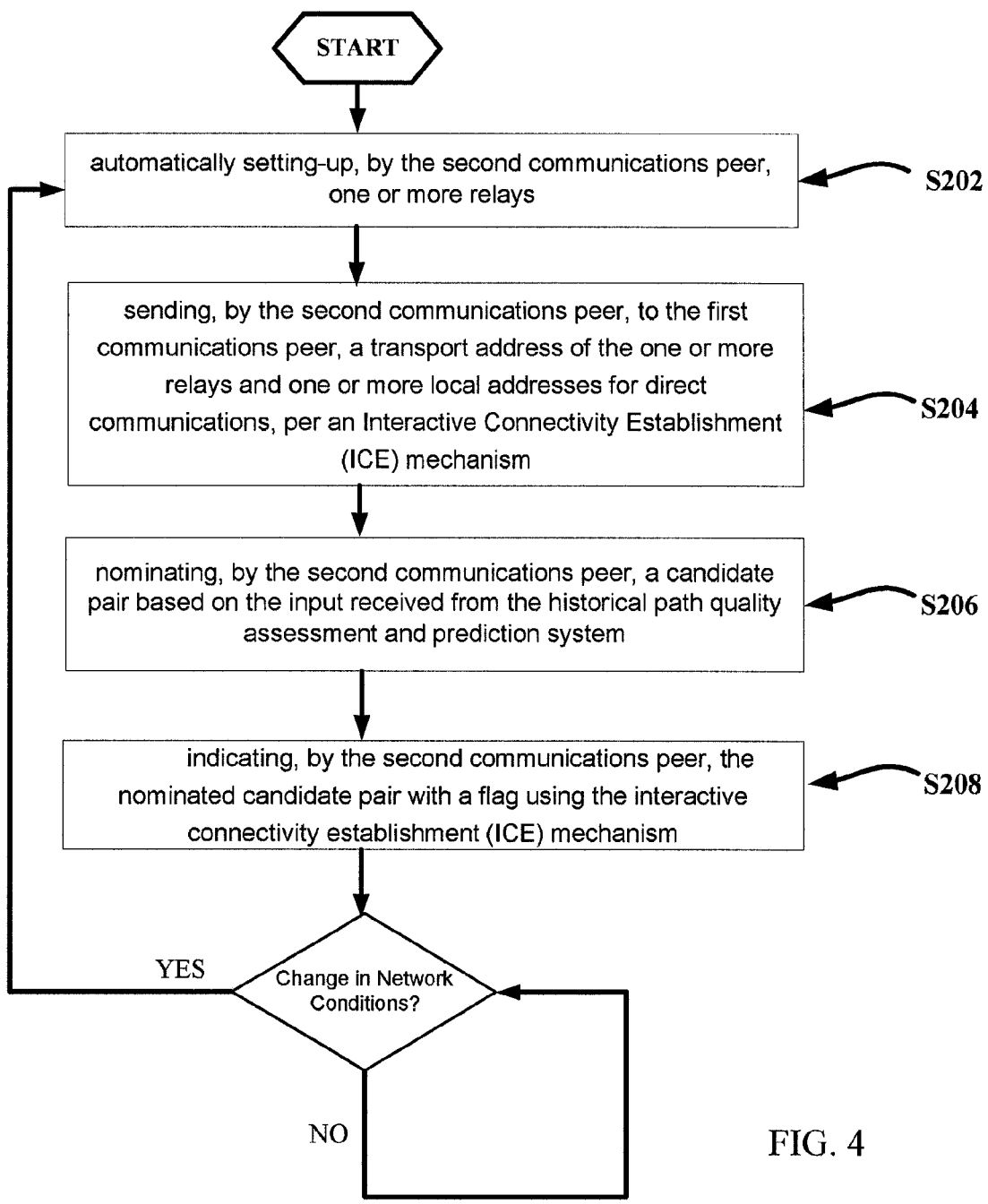
FIG. 4 depicts a method according to an embodiment of the invention.

With reference to FIGS. 1, 3, and 4, a method and system for automatically controlling in-bound traffic from a first communications peer to a second communications peer, according to an embodiment, will now be described.

An embodiment of a path quality assessment and prediction system can coexist and/or work in concert with an Interactive Connectivity Establishment (ICE) exchange. For example, as shown in FIG. 1, an embodiment of a system includes a first communications peer 10, a second communications peer 12, and a historical path quality assessment and prediction system 26. In this embodiment, the second communications peer 12 automatically sets-up one or more relays (e.g., relays R1, R2, etc.) and sends, to the first communications peer 10, a transport address of the one or more relays and one or more local addresses for direct communications, per an Interactive Connectivity Establishment (ICE) mechanism. The second communications peer 12 then nominates a candidate pair based on the input received from the historical path quality assessment and prediction system 26 and indicates the nominated candidate pair with a flag using the Interactive Connectivity Establishment (ICE) mechanism.

With reference to FIG. 4, a method of automatically controlling in-bound traffic from a first communications peer to a second communications peer based on an input received from a historical path quality assessment and prediction system, according to this embodiment, will now be described.

The exemplary method includes a step of automatically setting-up, by the second communications peer 12, one or more relays (e.g., relays R1, R2, etc.) (S202). Next, the method includes a step of sending, by the second communications peer 12 to the first communications peer 10, a transport address of the one or more relays and one or more local addresses for direct communications, per an Interactive Connectivity Establishment (ICE) mechanism (S204). The method further includes nominating, by the second communications peer 12, a candidate pair based on the input received from the historical path quality assessment and prediction system 26 (S206), and indicating, by the second communications peer 12, the nominated candidate pair with a flag using the Interactive Connectivity Establishment (ICE) mechanism (S108).

In another aspect, the method automatically controls the in-bound traffic from the first communications peer 10 to the second communications peer 12 pre-call or mid-call. For example, if a change in network conditions is determined mid-call, the second communications peer 12 sends one of an update or a re-invite, which restarts the Interactive Connectivity Establishment (ICE) mechanism, to the first communications peer 10. The second communications peer 12 then nominates a new candidate pair based on a new input from the historical path quality assessment and prediction system 26. The nominated candidate pair may be the same as the previously nominated candidate pair or a different candidate pair, depending on the path quality assessments.

In yet another aspect, the method maintains the flow of media between the first communications peer 10 and the second communications peer 12 until the different candidate pair is nominated by the Interactive Connectivity Establishment (ICE) mechanism, and then switches media flow to a new path when the different candidate pair is nominated by the Interactive Connectivity Establishment (ICE) mechanism. The switching of the media flow to the new path can be seamless. That is, the media keeps flowing on the old path until the new ICE process concludes, at which time media flow switches to the new path, potentially seamlessly.

The path quality assessments can be indicated in an Interactive Connectivity Establishment (ICE) mechanism. For example, an ICE candidate priority field can be used to capture the path quality assessments. As another example, an additional field or alternate field can be added to the ICE exchange to carry the path quality assessment or assessments.

This embodiment may be beneficial for pairing of candidates in a bi-directional case, and may provide further advantages if the measurements take advantage of the fact that the peer knows the multiple candidates.

Figure 5:
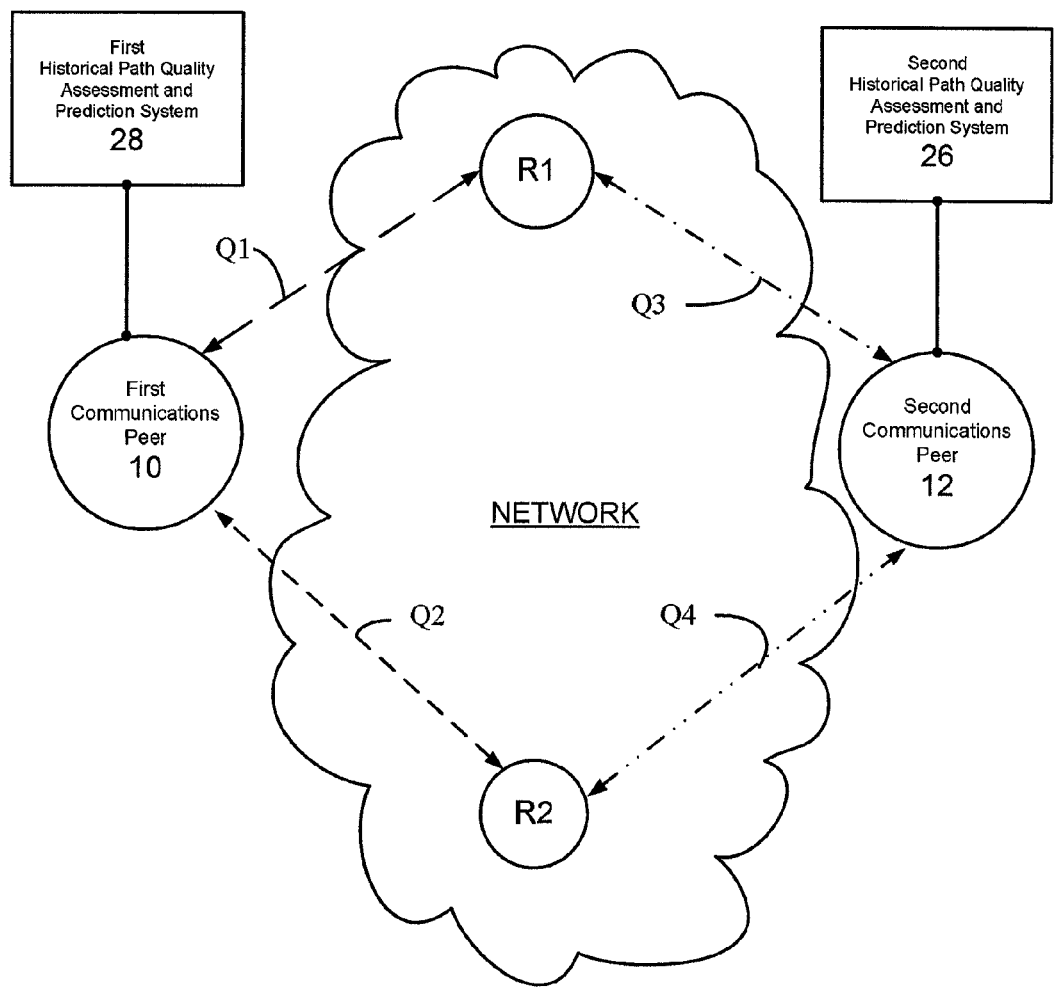
FIG. 5 depicts a system according to an embodiment of the invention.
Figure 6:
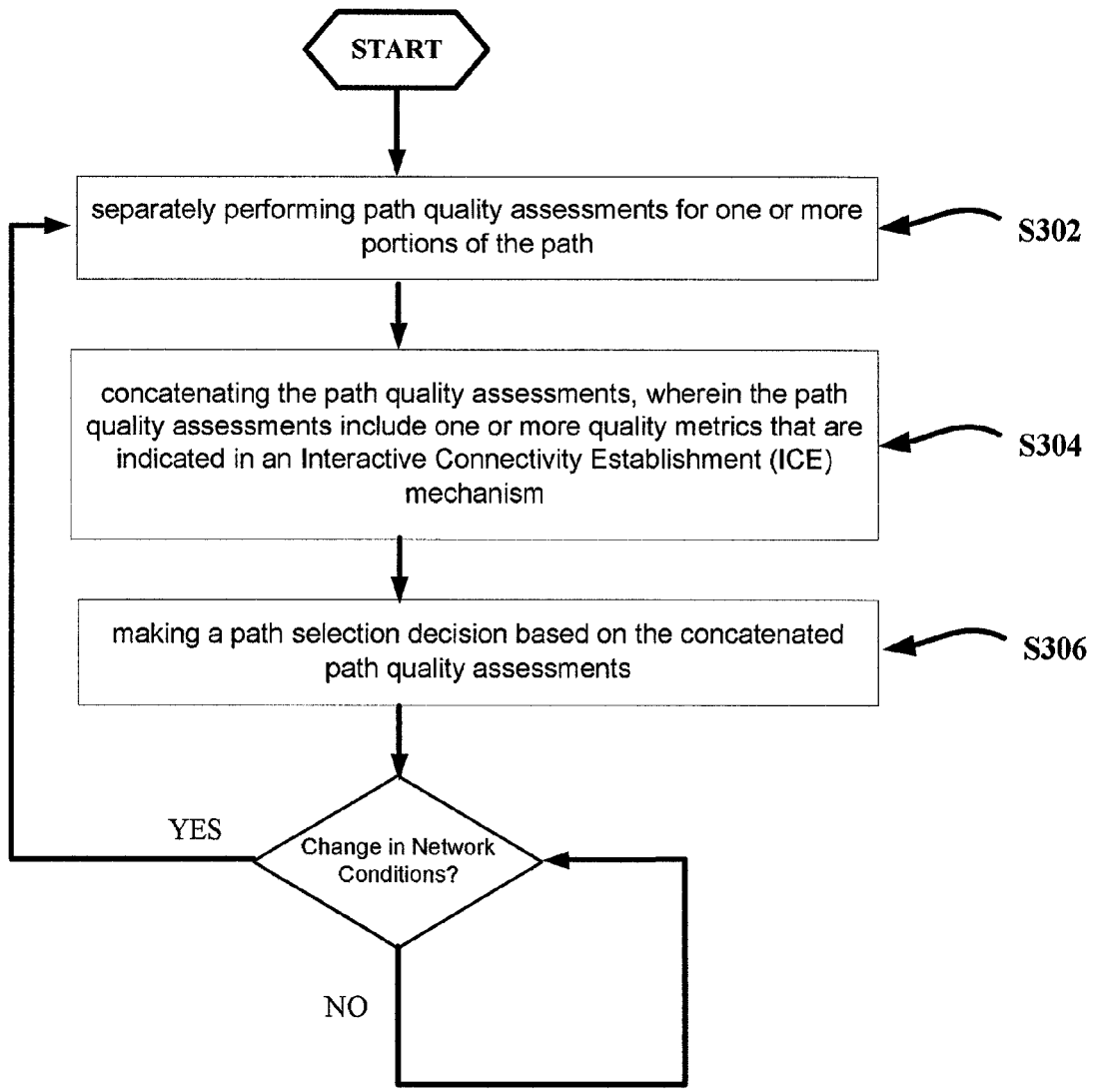
FIG. 6 depicts a method according to an embodiment of the invention.

With reference to FIGS. 5 and 6, a method and system for automatically controlling in-bound traffic from a first communications peer to a second communications peer, according to an embodiment, will now be described.

In an embodiment, the interaction in the Interactive Connectivity Establishment (ICE) can be used to provide improvements in path quality assessment and predictions. Particularly, the specific mechanisms within the Interactive Connectivity Establishment (ICE) exchange can be used to provide further improvements in path quality assessment and predictions. More particularly, the specific mechanisms within an Interactive Connectivity Establishment (ICE) exchange can be used to indicate the path quality assessments. In this embodiment, a hub and spoke system of communications peers and relays can be provided in which the path quality assessment of each side of the communication only is performed between each respective communications peer and the relay. This arrangement provides an important advantage with respect to scaling by reducing the number of connections and measurements needed, for example, from $O(n^2)$ to $O(n)$.

With reference to FIG. 5, the embodiment includes a historical path quality assessment and prediction system 26, which can be running, for example, on the second communications peer 12 or on a separate system interacting or communicating with the second communications peer 12. In conjunction, the embodiment includes another historical path quality assessment and prediction system 28, which can be running, for example, on the first communications peer 10 or on a separate system interacting or communicating with the second communications peer 10.

The exemplary system separately performs path quality assessments for one or more portions of the path, concatenates the path quality assessments, and makes a path selection decision based on the concatenated path quality assessments. In an embodiment, the path quality assessments include one or more quality metrics that are indicated in an Interactive Connectivity Establishment (ICE) mechanism. In another embodiment, the system selects an Interactive Connectivity Establishment (ICE) candidate pair based on the path selection decision.

For example, as shown in FIG. 5, the historical path quality assessment and prediction system 26 performs path quality assessments for a first portion of one or more paths, while the second historical path quality assessment and prediction system 28 performs path quality assessments for a second portion of the one or more paths. More particularly, the historical path quality assessment and prediction system 28 assesses the quality Q1 of the path between the first communications peer 10 and the relay R1, and the quality Q2 of the path between the first communications peer 10 and the relay R2. Similarly, the historical path quality assessment and prediction system 26 assesses the quality Q3 of the path between the second communications peer 12 and the relay R1, and the quality Q4 of the path between the second communications peer 12 and the relay R2.

The path quality assessments (e.g., Q1 and Q2) performed by the historical path quality assessment and prediction system 28 can be received by the second communications peer 12 and concatenated with the path quality assessments (e.g., Q3 and Q4) performed by the historical path quality assessment and prediction system 26 to make a path selection decision based on path quality.

The path quality assessments (e.g., Q1 and Q3, or Q2 and Q4) include one or more quality metrics that are indicated in an Interactive Connectivity Establishment (ICE) mechanism. The second communications peer 12 then selects an Interactive Connectivity Establishment (ICE) candidate pair based on the path selection decision. For example, the second communications peer 12 may select a path through relay R1.

As explained above, each path quality assessment (e.g., Q1, Q2, Q3, Q4, etc.) can include one or more quality metrics, for example, that are indicated in an Interactive Connectivity Establishment (ICE) mechanism. Moreover, one or more quality metrics provided to the first communications peer 10 by the historical path quality assessment and prediction system 28 can be used by the second communications peer 12 in combination with one or more metrics provided by the historical path quality assessment and prediction system 26 to the second communications peer 12 to make a path selection decision.

For purposes of the present disclosure, a quality metric generally is defined, for example, as a conclusion regarding the assessed quality of a path between a communications peer and a relay. The quality metric can be represented or indicated, for example, by a numeric value or values, or a combination of numeric values. The quality metric also can be represented or indicated, for example, by a qualitative value or values, or a combination of qualitative values. The quality metric can be a combination of a numeric value(s) and a qualitative value(s).

Examples of numeric values can include, but are not limited to, numbers or combinations of numbers. Examples of qualitative values can include, but are not limited to, letters such as A, B, C, etc., ratings or classifications such as good, fair, poor, etc., or colors such as white, brown, black, etc. The invention is not limited to the aforementioned examples and other quality metrics are contemplated by the present invention.

The quality metrics can be concatenated, for example, using a concatenation algorithm. One of ordinary skill in the art will recognize that the present invention contemplates using various algorithms for concatenating the quality metrics, including, but in no way limited to, simple actions such as averaging values, summation (e.g., summation of delay), etc., as well as more sophisticated calculations using different operations or combinations of operations, or different values or combinations of different values. For example, concatenation algorithms are contemplated for cases in which the metric or metrics include multiple values, such as multiple numeric values, multiple qualitative values, or combinations thereof.

As explained above, the quality metrics can be indicated in an Interactive Connectivity Establishment (ICE) mechanism. For example, an ICE candidate priority field can be used to capture a quality metric that represents a path quality assessment (e.g., Q1 can be indicated in the R1 candidate priority field sent by the first communications peer 10 to the second communications peer 12). As another example, an additional field or alternate field can be added to the ICE exchange to carry the quality metric of the path quality assessment.

With reference to FIG. 6, a method of automatically controlling traffic between a first communications peer to a second communications peer, will now be described.

The exemplary method includes separately performing path quality assessments for one or more portions of the path (S302) and concatenating the path quality assessments, wherein the path quality assessments include one or more quality metrics that are indicated in an Interactive Connectivity Establishment (ICE) mechanism (S304). Next, the method includes making a path selection decision based on the concatenated path quality assessments (S306). In another embodiment, the method further includes selecting an Interactive Connectivity Establishment (ICE) candidate pair based on the path selection decision.

The path quality assessments can be performed by the second communications peer 12 or a system interacting with the second communications peer 12 for a portion of the path between the second communications peer 12 and the relay. In conjunction, the path quality assessments can be performed by the first communications peer 10 or a system interacting with the first communications peer 10 for a portion of the path between the first communications peer 10 and the selected relay (e.g. R1).

The exemplary features of the invention provide a simple solution to the problem described above of affecting the media path of inbound traffic while taking into account path quality assessments. The present invention provides an important advantage of automatically setting up paths through relays and forcing the in-bound traffic to a communications peer to take a predetermined path, such as a preferred path.

As explained above, the exemplary features of the invention provide a simple solution to the problem described above of affecting the media path of inbound traffic while taking into account path quality assessments. The present invention provides an important advantage of automatically setting up paths through relays and forcing the in-bound traffic to a communications peer to take a selected path, such as a preferred path, based on robust historical and continuous path quality monitoring, assessments, and predictions. The exemplary aspects of the present invention provide important advantages over the conventional systems and methods, such as improving scale and flexibility and simplifying the operation of path selection and path quality assessment solutions. The features of the invention provide an advantage of allowing incorporation of path selection based on path quality assessments for quality optimization into the architecture of IP communications solutions based on Session Initiation Protocol (SIP) signaling, such as voice over IP (VoIP) and video over IP, and Session Description Protocol (SDP) without requiring changes to the solution architecture, such as using overlay networks, tunneling and encapsulation, which can be costly from an operations-perspective. For example, the features of the invention can provide quality-improvement features through path selection solution based on path quality assessments to IP communications devices such as P2P-SIP IP phones, and to additional types of IP endpoints, gateways, Session Border Controllers (SBC), Media Servers and other devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of automatically controlling traffic between communications peers, the method comprising:
    performing path quality assessments for a first portion of a path between a first communications peer and a second communications peer at a first historical path quality assessment and prediction system;
    performing path quality assessments for a second portion of the path between the first communications peer and the second communications peer at a second historical path quality assessment and prediction system;
    concatenating the path quality assessments for the first and second portions of the path between the first communications peer and the second communications peer at the second communications peer or the second historical path quality assessment and prediction system, wherein the path quality assessments include one or more quality metrics that are indicated in an Interactive Connectivity Establishment (ICE) mechanism; and
    making a path selection decision at the second communications peer or the second historical path quality assessment and prediction system based on the concatenated path quality assessments.

2. The method according to claim 1, further comprising:
    selecting an Interactive Connectivity Establishment (ICE) candidate pair based on the path selection decision.

3. The method according to claim 1, wherein the second portion of the path exists between the second communications peer and a relay, and
    wherein the first portion of the path exists between the first communications peer and the relay.

4. The method according to claim 1, wherein the indication in the Interactive Connectivity Establishment (ICE) mechanism is in an ICE candidate priority field.

5. The method according to claim 1, further comprising:
    sending, by the second communications peer to the first communications peer, one of an update or a re-invite including a transport address associated with the path selection decision.

6. The method according to claim 1, wherein the path between the first communications peer and the second communications peer includes only the first and second portions and at least one relay.

7. A system for automatically controlling traffic between communications peers, the system comprising:
    a first communications peer;
    a first historical path quality assessment and prediction system that performs path quality assessments for a first portion of one or more paths;
    a second communications peer; and
    a second historical path quality assessment and prediction system that performs path quality assessments for a second portion of the one or more paths,
    wherein the second communications peer or second historical path quality assessment and prediction system concatenates the path quality assessments for the first and second portions of the one or more paths,
    wherein the path quality assessments include one or more quality metrics that are indicated in an Interactive Connectivity Establishment (ICE) mechanism, and
    wherein the second communications peer or second historical path quality assessment and prediction system makes a path selection decision based on the concatenated path quality assessments.

8. The system according to claim 7, wherein the second historical path quality assessment and prediction system performs the path quality assessments for a portion of the path between the second communications peer and a relay, and
    wherein the first historical path quality assessment and prediction system performs the path quality assessments for a portion of the path between the first communications peer and the relay.

9. The system according to claim 7, wherein the second communications peer or second historical path quality assessment and prediction system selects an Interactive Connectivity Establishment (ICE) candidate pair based on the path selection decision.

10. The system according to claim 7, wherein the indication in the Interactive Connectivity Establishment (ICE) mechanism is in an ICE candidate priority field.

11. The system according to claim 7, wherein the second communications peer sends to the first communications peer one of an update or a re-invite including a transport address associated with the path selection decision.

12. The system according to claim 7, wherein the path between the first communications peer and the second communications peer includes only the first and second portions and at least one relay.

* * * * *